March 28, 1939.   O. F. NILSSON   2,151,866
RECORDING PRECIPITATION GAUGE
Filed Dec. 30, 1936   3 Sheets-Sheet 1

O. F. Nilsson
INVENTOR
By: Hascock Downing & Seebold
Attys.

March 28, 1939.  O. F. NILSSON  2,151,866
RECORDING PRECIPITATION GAUGE
Filed Dec. 30, 1936  3 Sheets-Sheet 2

O. F. Nilsson
INVENTOR

By Glascock Downing & Seebold
Attys.

March 28, 1939.  O. F. NILSSON  2,151,866
RECORDING PRECIPITATION GAUGE
Filed Dec. 30, 1936  3 Sheets-Sheet 3

Patented Mar. 28, 1939

2,151,866

UNITED STATES PATENT OFFICE 2,151,866

RECORDING PRECIPITATION GAUGE

Olof Fabian Nilsson, Stockholm, Sweden

Application December 30, 1936, Serial No. 118,387
In Sweden January 4, 1936

12 Claims. (Cl. 73—151)

My present invention relates to recording precipitation gauges or rain gauges. More particularly my invention relates to recording precipitation gauges of the kind in which the amount of the precipitation falling into the instrument is determined by means of a weighing apparatus adapted to control the deflection of a recording pen, and in which the container holding the precipitation which is being weighed is periodically emptied to restore the recording pen to its starting position.

A knowledge of the amount and intensity of the precipitation is of great importance not only for scientific purposes but for practical purposes as well. Both in the water-power industry and in agriculture it is important to know how rapidly a certain amount of precipitation has fallen. A slowly falling drizzling rain has quite another effect than the same amount of precipitation falling in the form of a torrent. In the former case the precipitation seeps into the ground and benefits vegetation, whereupon the greater part thereof evaporates, in the latter case most of it will run off to lakes and streams where it can be utilized for producing energy. To engineers responsible for the laying out of drainage systems for towns and cities the knowledge of the maximum intensity of rain falls is important, since such drainage systems must be dimensioned with regard to the greatest amount of precipitation that can fall during a short period of time. There is therefore a great demand for a recording precipitation gauge which is capable of furnishing full and detailed information as to the manner in which the precipitation has fallen.

It is a general object of my invention to provide a recording precipitation gauge by means of which continuous and extremely accurate large scale records of the precipitation falling during a long period of time can be automatically produced.

It is a particular object of my invention to provide a recording precipitation gauge which requires a minimum of supervision.

Another object of my invention is to provide a recording precipitation gauge in which the container holding the precipitation being weighed is emptied rapidly and completely each time the weight of the precipitation collected in said container exceeds a predetermined value.

Another object of my invention is to provide a recording precipitation gauge in which friction between the movable parts of the instrument is reduced to a minimum to eliminate recording errors caused by such friction.

Another object of my invention is to counterbalance the weight of the moving parts of the recording mechanism controlled by the weighing apparatus so as to eliminate other sources of errors.

A further object of my invention is to reduce friction between the recording pen and the record strip to a small value, which as much as possible is independent of the condition of the chart.

Still another object of my invention is to provide a recording precipitation gauge which permits of obtaining reliable continuous records of snow falls and frozen rain.

Further objects of my invention will become evident from the following detailed description with reference to the accompanying drawings.

The invention will now be described more in detail having reference to the drawings annexed to this specification and forming part thereof which show by way of example an embodiment of my invention.

In the drawings—

Figure 1:
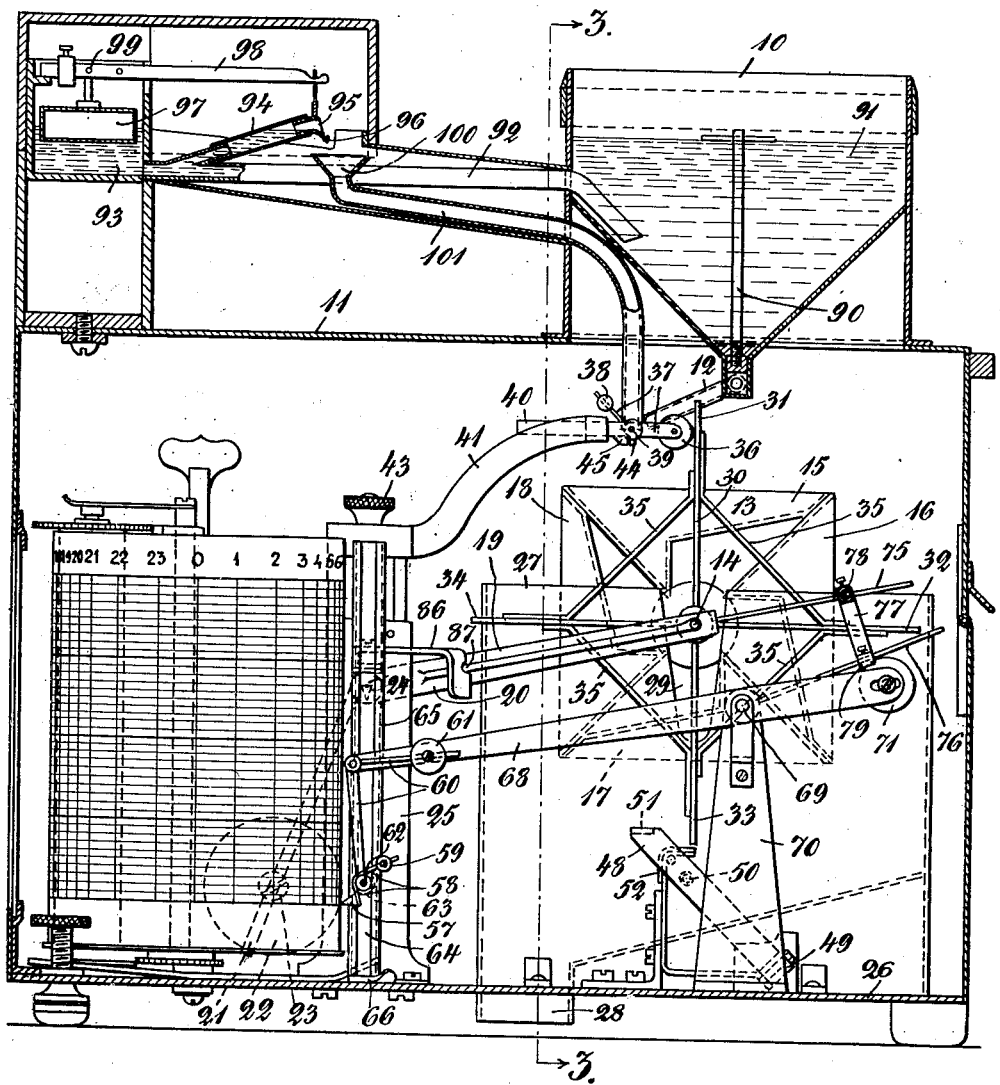
Figure 1 is a front view of the apparatus with the front wall of the housing removed.
Figure 2:
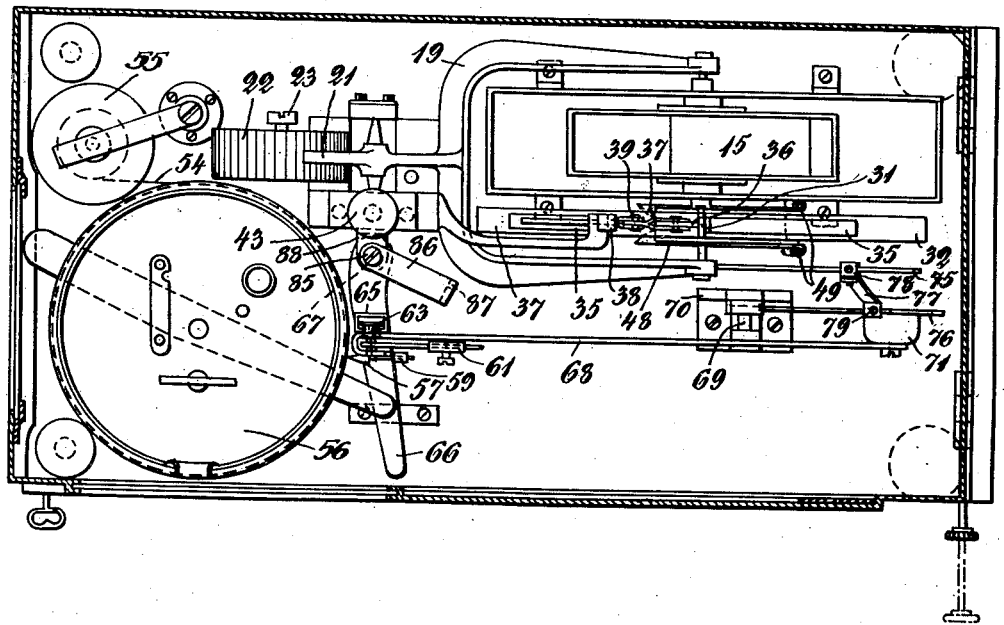
Figure 2 is a plan view of the apparatus with the cover removed.
Figure 3:
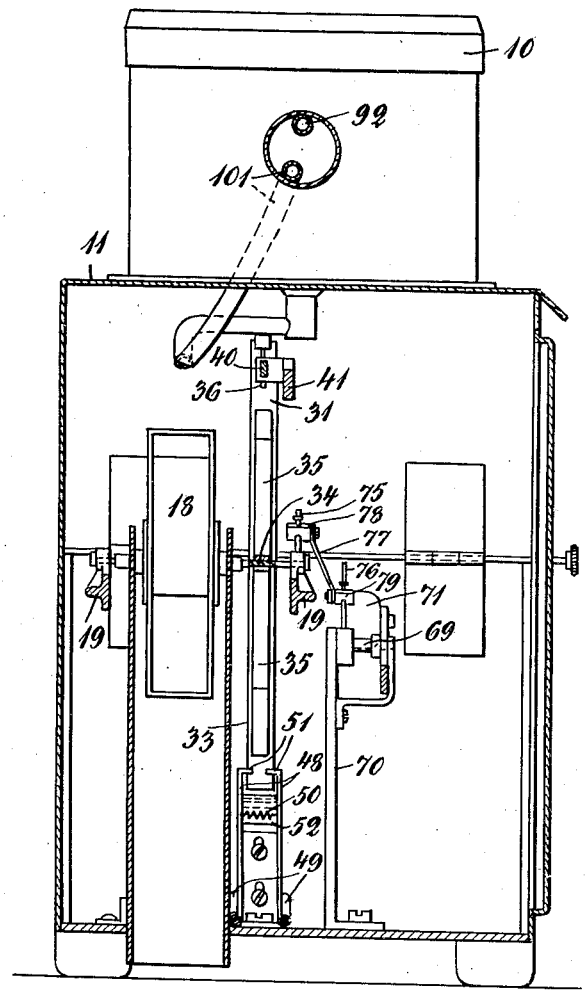
Figure 3 is a vertical section on the line 3—3 in Figure 1.

Referring to the drawings, 10 designates the precipitation collector of the apparatus, the collector having the shape of an open funnel with an upper free surface of, for instance, 200 square centimeters. The funnel 10 is supported in the cover 11 of the apparatus housing with the beak of the funnel passing through an aperture in the cover. The precipitation falling into the funnel 10 is discharged through a tube 12 connecting to the beak of the funnel and ending a short distance above a square bucket wheel 13 which is rotatably journalled in a horizontal shaft 14. The bucket wheel 13, which has four similar buckets 15, 16, 17 and 18, normally takes up one of four different angular positions with one of the buckets in position to receive the precipitation from the tube 12. Each bucket is so shaped that in its uppermost precipitation receiving position it has a greater volume to the left of a vertical plane extending through the shaft 14 of the bucket wheel 13 than to the right of said plane, so that the weight of the precipitation contained in the bucket tends to rotate the wheel 13 in a counter-clockwise direction. In Figure 1 the bucket 15 is uppermost and in position to receive the precipitation; it is evident that the precipitation initially collects in the left hand portion of said bucket, because the bottom of the bucket slopes towards the left.

The horizontal shaft 14 of the bucket wheel 13 is journalled in the bifurcated end 19 of a rod 20 forming one arm of a balance beam the other arm 21 of which carries a weight 22 which is displaceable along the arm and adapted to be fixed in adjusted position by means of a screw 23. The balance beam is supported on knife edges 24 which rest on an upright 25 extending from the bottom plate 26 of the apparatus. The bucket wheel 13 is placed in the upper part of a collecting box 27 having a discharge opening 28 at the bottom and provided in its upper side wall edges with vertical slots 29 adapted to receive the horizontal shaft 14 of the bucket wheel 13. Rigidly secured to the shaft 14 of the bucket wheel 13 externally of the box 27 is a stop wheel 30 having four flat-iron arms 31, 32, 33 and 34 spaced 90° apart, the stop wheel 30 being secured on the bucket wheel shaft 14 in such an angular position that each of its arms is perpendicular to the peripheral edge of the corresponding bucket, the various arms extending somewhat beyond the respective edges of the bucket wheel. Bracing irons 35 are provided between the stop wheel arms.

In the path of the arms 31, 32, 33 and 34 of the stop wheel 30 is arranged a stop abutment in the form of a roller 36. Said roller is rotatably journalled in the end of one arm of a bell-crank lever 37 the other end of which carries a counterweight 38. The bell-crank lever 37 is pivotally supported at 39 in the end of an arm 40 which is supported for horizontal adjustment in the end of a horizontally extending arm 41 the other end of which is adapted to slide vertically in the column 25, on actuation of an adjusting screw 43 serving to hold the arm 41 in adjusted position. The bell-crank lever 37 carrying the stop roller 36 is provided at its underside with an abutment 44 which cooperates with an abutment 45 on the arm 40 to prevent the roller 36 from dropping below the position shown in the drawings, in which its axis of rotation is slightly beneath a horizontal plane through the pivot 39.

The precipitation collected in the funnel 10 is immediately discharged through the tube 12 into the uppermost bucket 15 of the bucket wheel 13. The arm 20, 19 of the balance beam is loaded according as precipitation is collected in the bucket 15, wherefore the bucket wheel 13 is gradually lowered. The arm 31 of the stop wheel 30, which arm rests at its upper end against the abutment roller 36, is lowered together with the bucket wheel 13 until the extreme end of the arm 31 reaches the lower portion of the abutment roller 36, when the roller is suddenly lifted by the end of the arm 31 whereby the stop wheel 30 is released permitting the bucket wheel 13 to start rotating counter-clockwise under the influence of the weight of the water collected in the bucket 15, the contents of the bucket 15 being during the rotation emptied into the box 27.

The rotation of the bucket wheel 13 is retarded on completion of a little less than one quarter of a revolution by the arm 34 of the stop wheel 30 passing through a wedge-shaped opening formed between two pawls 48, which are pivoted at 49 on the bottom plate 26 of the apparatus so as to extend in a sloping direction towards the stop wheel 30 and which are held pressed against each other by means of a helical spring 50. When the arm 34 has passed behind the hooks 51 of the pawls 48 it strikes against a fixed stop 52 which is disposed between and below the pawls 48 and is made of a soft elastic material, for instance leather. The pawls 48, which were separated by the stop wheel arm 34 when the latter passed between them, in their normal position prevent said arm from rebounding due to the impact against the fixed stop 52. Initially the arm 34 is held in the space formed between the stop 52 and the hooks of the pawls 48. Immediately after the arm 34 has passed between the pawls 48, however, the weight 22 on the balance beam will have raised the emptied bucket wheel 13 together with the stop wheel 30 to the upper position shown on the drawings. During this upward movement the arm 34 will be drawn out of engagement with the side of the stop 52, and the upper end of the diametrically opposite arm 32 of the stop wheel 30 will instead be brought into engaging position in respect to the abutment roller 36 and will engage the latter upon a further slight rotation of the stop wheel 30. This rotation brings the arm 34 right above the upper surface of the stop 52, any oscillations of the balance beam about its axis of rotation being then prevented due to the stop 52 being now in the vertical path of movement of the arm 34.

After the above described advancing of the bucket wheel has been completed, an operation which actually will require only a fraction of a second, a new bucket 16 will be in position to receive the precipitation collected by the funnel 10. The precipitation first fills the left hand part of the bucket 16, and the stop wheel arm 32 is therefore automatically held pressed against the stop abutment 36 until a new tipping-over of the bucket wheel 13 is effected.

The recording of the amount of precipitation collected by the funnel 10 is effected on a paper record strip 54 which is rolled off from a vertically disposed rotatable store cylinder 55 onto a vertically disposed recording cylinder 56 which is rotated at a uniform speed by clock-work, not shown. The recording pen 57 cooperating with the record strip 54 is secured at the end of the vertical arm of a bell-crank lever 58, the horizontal arm of which is loaded with a small weight 59. The bell-crank lever 58 is pivoted to the lower end of the vertical arm of a second bell-crank lever 60, the horizontal arm of which is loaded with a weight 61. On the pivot 62 connecting the bell crank levers 58 and 60 is rotatably journalled a flanged roller 63 which is movable in a vertical slot 64 provided in a column 65 extending from a lever 66, which is slidable on the bottom plate 26 of the apparatus around a pivot 67. The bell-crank lever 60 is pivoted at the left hand end of a connecting lever 68 which is pivoted for movement in a vertical plane in a bearing 69 supported in a column 70 extending from the bottom plate 26. The weight of the bell-crank levers 58 and 60 is counter-balanced by a counterweight 71 at the right hand end of the connecting lever 68.

The means for connecting the balance beam with the writing mechanism comprise a rod 75 extending longitudinally from the bifurcated end 19 of the balance beam, another rod 76 extending from the right hand end of the connecting lever 68, and a connecting link 77 which articulates in sleeves 78 and 79, which are slidable on the rods 75 and 76 and can be locked in any desired position by means of locking screws. By moving the sleeves 78 and 79 in either direction along the respective rods 75 and 76 a change in the ratio between the downward movement of the bucket wheel 13 and the simultaneous upward movement of the recording pen 57 can be effected within certain limits. It is thus possible to adjust the apparatus to record the precipitation at any desired scale, within limits.

Since the flanged roller 63 will always be at the same distance from the surface of the recording cylinder 56, the recording pen 57 supported in the bell-crank lever 58 having the shaft of the roller as a pivot will obviously in all positions press against the record strip with the same pressure, the magnitude of the pressure depending only on the loading of the bell-crank lever.

For the purpose of locking the balance beam during transport of the apparatus, the lever 66 supporting the guide column 65 is provided concentrically with its pivot 67 with a vertical rod 85, to the upper end of which there is rigidly secured an arm 86 provided with a slot 87 adapted, on shifting of the lever 66 counter-clockwise, to embrace the arm 20 of the balance beam. At its upper end the rod 85 is journalled in a bearing provided in a bracket 88 secured to the column 65. The shifting of the lever 66 counter-clockwise will evidently also bring the guide 65 away from the recording cylinder 56, so that the recording pen will also be prevented from making contact with the record strip 54.

The recording precipitation gauge described can be used as well for producing continuous and accurate records of precipitation in the form of snow, hail or frozen rain. According to the invention the snow or the like is first converted into liquid form by being collected in a body consisting of a watery solution of a chemical having the property of being able rapidly to melt the snow. When cold weather is expected, the inlet from the funnel 10 to the tube 12 is therefore closed by means of a sealing screw 90, whereupon a watery solution 91 of, for instance, calcium chloride is filled into the funnel 10. The calcium chloride solution has the effect of converting almost immediately snow or hail falling into the funnel 10 into liquid form, particularly if the solution is held at a fairly high temperature. According to the invention the temperature of the contents of the funnel is held above the ambient temperature by installing in the housing of the apparatus a source of heat, for instance an incandescent lamp. The snow collecting in the funnel will melt almost immediately, and will have no or only a slight tendency to stick to the sides of the funnel. By arranging an ordinary overflow in the funnel, the excess liquid could be made to discharge directly into the bucket wheel 13 to be recorded in the before mentioned manner, but it has been found that this simple manner of discharging the added liquid will cause certain errors of measurement due to the influence of the surface tension of the liquid. These errors are minimized according to the invention by providing the auxiliary mechanism presently to be described.

The funnel 10 communicates by means of a tube 92 with an auxiliary container 93, so that the solution of calcium chloride will rise to the same level in the auxiliary container 93 as in the funnel 10. The auxiliary container is provided with an outlet in the form of a hollow rubber tube 94 extending upwardly from the communicating tube 92. The end 95 of the rubber tube is provided with a lip 96 substantially of the shape indicated on the drawings and is movable up and down under control of a float 97 disposed in the auxiliary container, said float being suspended at one end of a lever 98 at the other end of which the free end 95 of the rubber tube 94 is suspended. The lever 98 is pivoted at 99 in a recess in the wall of the container 93. When the float 97 is raised due to the collection of precipitation in the funnel 10, the free end 95 of the rubber tube will evidently be lowered. Since the ratio between the lengths of the two arms of the lever 98 is preferably 7:1 or greater, already a slight raising of the float, that means of the level in the funnel 10, will produce a sufficient lowering of the mouth 95 of the rubber tube to overcome the surface tension of the liquid, so that discharge of liquid through the tube takes place. The calcium chloride solution discharged through the rubber tube falls into a funnel 100 connecting with an extra tube 101 opening above the bucket wheel 13 near the mouth of the tube 12. The recording of the precipitation in the form of snow is then effected in the same manner as described above for precipitation in the form of rain.

The invention is not limited to the embodiment described but can be modified in different ways within the scope of the appended claims.

I claim:

1. A recording precipitation gauge comprising in combination a precipitation receiving bucket wheel, said bucket wheel being adapted to rotate about a horizontal shaft under the influence of the weight of the collected precipitation, weighing means supporting said bucket wheel, and means for normally locking said bucket wheel against rotation, said locking means being adapted to be released at intervals under control of said weighing means to permit advancing of said bucket wheel discharging the contents of one bucket while bringing another bucket into precipitation receiving position.

2. A recording precipitation gauge comprising in combination a precipitation collecting funnel, a bucket wheel mounted beneath said funnel to receive the precipitation collected by the latter, said bucket wheel being adapted to rotate about a horizontal shaft under the influence of the weight of the collected precipitation, a weighing means supporting said bucket wheel, means for normally locking said bucket wheel against rotation, said locking means being adapted to be released under control of said weighing means to permit advancing of said bucket wheel discharging the contents of one bucket while bringing another bucket into precipitation receiving position, a movable recording pen controlled by said weighing means, and a record strip movable at a uniform speed transversely of the path of movement of said recording pen in contact therewith.

3. A recording precipitation gauge according to claim 2, characterized in that the buckets of the bucket wheel in their precipitation receiving positions extend on both sides of a vertical plane passing through the axis of the wheel and are so shaped, that the turning moment caused by the weight of the liquid container in the portion of the bucket at one side of said plane is partly compensated by the turning moment caused by the liquid container in the portion at the other side of said plane, whereby the force required to hold the wheel against rotation and the attendant friction is minimized.

4. A recording precipitation gauge comprising in combination a precipitation receiving bucket wheel, said bucket wheel being adapted to rotate about a horizontal shaft under the influence of the weight of the collected precipitation, a weighing means supporting said bucket wheel, means for normally holding said bucket wheel against rotation said holding means being adapted to be released periodically under control of said weighing means, a movable recording pen controlled by said weighing means, a record strip movable transversely of the path of movement of said recording pen in contact therewith, a guide located at a definite distance from said record strip, and a member movable in said guide, said recording pen being supported in such a manner in said member as to bear against the record strip with a very small constant pressure.

5. A recording precipitation gauge comprising in combination a balance beam, a weight supported at one end of said beam, a bucket wheel supported for rotation about a horizontal axis at the other end of said beam, a precipitation collecting funnel adapted to discharge into said bucket wheel, means adapted normally to hold said bucket wheel against rotation and adapted to be released on lowering of said bucket wheel a predetermined distance, thereby permitting said bucket wheel to rotate discharging its contents and bringing another one of its buckets into precipitation receiving position, a recording pen movable under control of said balance beam, and a record strip movable at uniform speed in contact with said recording pen.

6. A recording precipitation gauge comprising in combination a balance beam, a weight supported at one end of said balance beam, a bucket wheel supported for rotation about a horizontal axis at the other end of said balance beam, a precipitation collecting funnel adapted to discharge into said bucket wheel, a stop wheel having a number of radial arms corresponding to the number of buckets of the bucket wheel, said stop wheel being fixedly united with said bucket wheel coaxially therewith, a stationary stop abutment, said stop abutment being positioned so as to normally engage with the end of one arm of said stop wheel and to be released therefrom on the lowering of said stop wheel a predetermined distance thereby permitting said bucket wheel to rotate discharging its contents and bringing another one of its buckets into precipitation receiving position, said bucket wheel being held in said new position by another arm of said stop wheel, a recording pen movable under control of said balance beam, and a record strip movable at a uniform speed in contact with said recording pen transversely of the direction of movement thereof.

7. A recording precipitation gauge as claimed in claim 6, in which said stop abutment consists of a roller pivotally mounted at the free end of an arm adapted to swing upwards from a horizontal position.

8. A recording precipitation gauge as claimed in claim 6, including means adapted to brake the advancing speed of said bucket wheel before the wheel has completed its predetermined rotation.

9. A recording precipitation gauge as claimed in claim 6, including means for preventing pendulous motion of said bucket wheel in a vertical direction on the completed advancing of said wheel.

10. A recording precipitation gauge comprising in combination a precipitation collecting vessel, a body consisting of a watery solution of calcium chloride in said vessel, a container, means for conducting excess liquid from said vessel into said container, means for determining the amount of liquid collected in said container, and recording means controlled by said amount determining means.

11. A recording precipitation gauge comprising in combination, an opening precipitation collecting vessel, a closed auxiliary wheel communicating with said open vessel, a body consisting of a snow melting liquid filling said open vessel and said closed vessel, overflow means on said closed vessel adapted to be raised and lowered in dependency of the lowering and raising of the free surface of the liquid contained therein to compensate for irregularities of discharge caused by the surface tension of the liquid, a receiver adapted to receive the liquid discharged by said overflow means, means for determining the amount of liquid collected in said receiver, and recording means controlled by said amount determining means.

12. A recording precipitation gauge comprising in combination an open precipitation collecting vessel, a closed auxiliary vessel communicating with said open vessel, a body consisting of a watery solution of calcium chloride filling said open vessel and said closed vessel, a flexible overflow pipe for said liquid, a float in said auxiliary vessel, a lever pivoted near one of its ends and coupled at the one end of its short arm to said float and at the free end of its long arm to the mouth of said overflow pipe, a receiver beneath the mouth of said overflow pipe adapted to receive the discharge of liquid through said pipe occurring on the raising of said float, means for determining the amount of liquid collected in said receiver, and recording means controlled by said amount determining means.

OLOF FABIAN NILSSON.